Oct. 20, 1959　　　L. R. BRAZIK　　　2,908,956
FASTENERS
Filed July 18, 1957
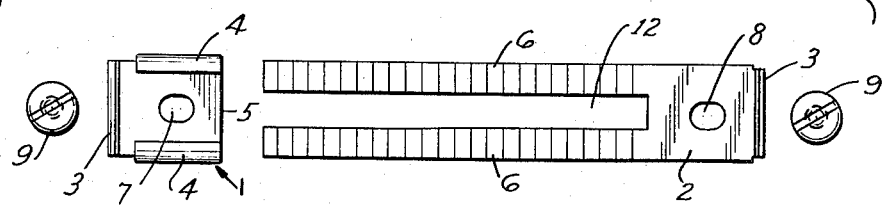
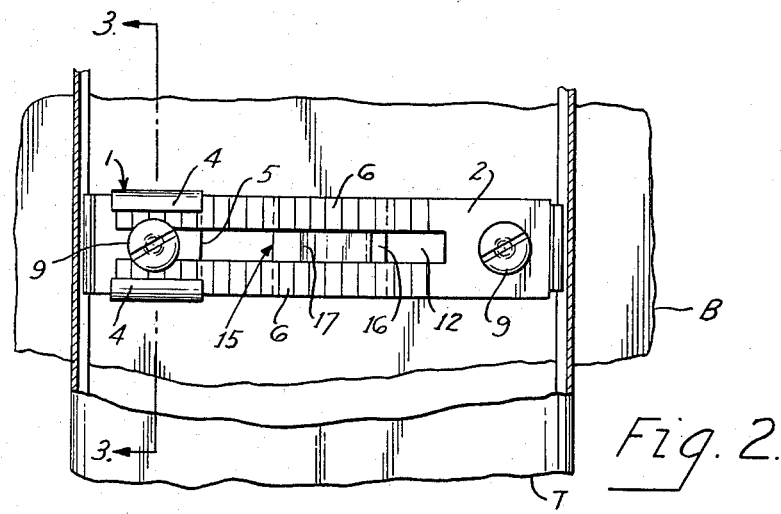
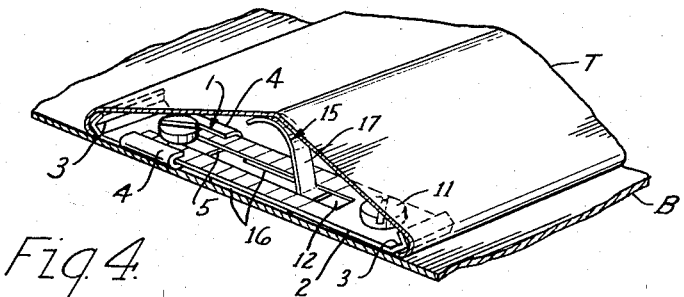
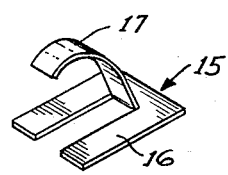
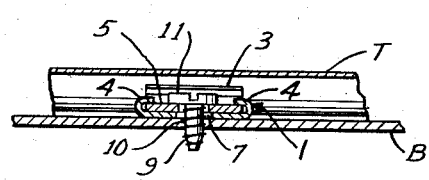
INVENTOR.
Lewis R. Brazik,
BY
John A. Kinnard,
his ATTORNEY.

United States Patent Office

2,908,956
Patented Oct. 20, 1959

2,908,956

FASTENERS

Lewis R. Brazik, Hinckley, Ohio

Application July 18, 1957, Serial No. 672,729

4 Claims. (Cl. 24—73)

This invention relates to fasteners for securing to automobile bodies decorative trim or garnish molding of the type which has a front or outer decorative face and inturned marginal attaching flanges along its rear or inner face.

As the trim of automobile bodies has become a more dominant part of the design, the shapes and sizes have become more involved and complicated. In the earlier types of trim, most of the trim material, except for very short tapered end portions, was generally of constant width throughout its length, so that, for a given piece of trim, fasteners of a certain size and shape could be used for each point of attachment along the length of the trim. However, many of the trim pieces are now tapered for substantial portions of their length and have lateral offsets and irregular contours such that different shapes and sizes and types of fasteners are used at different locations, respectively, along the length of even a single piece of trim. Quite generally, each fastener is specifically detailed for the particular part of the trim in which it is to fit, and thus the part of the fastener which is secured to the trim must be varied considerably to cooperate properly with different widths and shapes of trim. At the same time, the apertures which are provided in the automobile body for receiving the attaching means of the fasteners are arranged at locations determined by the locations of the fastening means of the different fasteners.

This is entirely satisfactory from the standpoint of original automobile body production in which, once the design has been standardized, the body can be provided in advance with all of the necessary apertures and the fasteners readily inserted and will receive the trim properly.

However, it frequently happens that bodies are damaged or that the trim is ripped off accidentally, and it becomes necessary for a repairman to replace the trim with a new section of trim. When this is necessary, he is confronted with a difficult and time consuming problem.

First, he must find a fastener which is of the proper width and shape to snap-fasten into the trim at the particular location endwise of the trim at which the perforations are provided in the body. Having found a fastener which can be secured readily to the trim at this location, then he is confronted with the fact that the body apertures, adapted to receive the attaching screws or shanks of the original fasteners, are not aligned with the shanks of the newly provided fasteners. Furthermore, in trying to install a makeshift type of fastener which will fit exactly to the needs of the particular part of the trim and location of body aperture in which it is installed, the operator is working blind in that he must install the fastener in the trim and then test to see that the fastener will engage the body aperture, but even if he meets these coexisting requirements, he cannot be quite sure whether or not the trim will be in the right position until the fastener and trim have been installed on the body. If, then, he finds that it is not in the proper position, he must remove the trim again, relocate the fastener or install new ones, and again chance that the trim will be connected in its proper location. However, this is a very frustrating and time-consuming operation and greatly adds to the expense of installing the trim. Unfortunately, after the trim is installed, it is not apparent to the customer that considerable difficulty was experienced in installing it, and quite often the repairman must confront the customer with a large labor charge for which there is no visible justification.

Again, to install the trim with the fasteners originally provided, even though a large number are at hand, it is quite often necessary to remove panels from the inside of the body, and if makeshift fasteners are to be used, this is almost essential.

Accordingly, it is one of the objects of the present invention to provide a fastener of which a plurality can readily be installed and adjusted so that, after installation, a length of trim can be snap fastened in proper location by pressing its open side or flanged face foremost toward the fasteners, and which, when installed, will assuredly be in the preselected position on the body.

Another object is to provide an anti-rattling device for use in connection with the fastener.

Various other objects and advantages will become apparent from the following specification wherein reference is made to the drawings, in which Fig. 1 is an exploded top plan view of an adjustable fastener which embodies the principles of the present invention, the parts of the fastener being shown in separated condition;

Fig. 2 is a top plan view of the fastener in Fig. 1, showing it installed on an automobile body and cooperating with a length of trim for holding the trim on the body, part of the trim being shown in section for clearness in illustration;

Fig. 3 is a fragmentary longitudinal sectional view taken on the line 3—3 in Fig. 2;

Fig. 4 is a perspective view of the fastener, trim, and portion of an auto body illustrated in Fig. 2, part thereof being shown in section for clearness in illustration; and Fig. 5 is a perspective view of the anti-rattling device.

Referring to the drawings, the fastener of the present invention comprises a pair of members 1 and 2 which are arranged to be telescopically interfitted so as to be extensible and contractible endwise. Each of the members 1 and 2 has an outer or forward face and an opposite or rear face, the latter of which is adapted to lie in juxtaposition with the surface of the automobile body on which the fastener is to be installed. In order to grip the trim to be secured on the body by the fastener, each of the members 1 and 2 has at its outermost end a retaining flange 3 which extends transversely of the member and faces forwardly from the forward face thereof, and which is bent outwardly endwise of the member and then inwardly, or inturned slightly at its inner margin, so as to provide a guiding or cam surface for spreading a length of trim to permit the flanges of the trim to snap over the outermost ends or peaks of the flanges of the fastener for holding the trim in place. The members 1 and 2, as mentioned, are telescopically mounted for endwise movement relative to each other, and for this purpose, the member 1 is provided along its lateral margins with inturned flanges 4. The flanges 4 define guide channels which are open toward each other and at the innermost end 5 of the body 1.

The member 2 is provided with fingers 6 which extend lengthwise thereof and are spaced apart from each other transversely of the body. The fingers 6 are adapted to be received in the channels provided by the flanges 4 endwise of the flanges from the inner end of the member 1 and to fit sufficiently snugly so as to maintain the members 1 and 2 in alignment as they are moved to different relatively telescoped positions.

The member 1 is provided with an opening 7 which may be in the form of an aperture or may be a notch extending entirely to the inner end of the member 1, if desired. In any event, the aperture is preferable and is elongated lengthwise of the member 1.

The member 2 also is provided with a corresponding aperture 8. These apertures are adapted to receive suitable metal engaging screws 9 which are adapted for screw threaded engagement with suitable apertures, indicated at 10, in an automobile body B on which the fastener is to be installed.

The screws 9 have large heads 11. The spacing 12 between the fingers 6 is preferably of the same width as the aperture 7 so that, in various relatively telescoped positions of the members 1 and 2, the space 12 between the fingers 6 will be in alignment axially of the screws 9 with the aperture 7. The head 11 of the screw is of sufficient width to overlie the fingers 6, and thus, when screwed firmly into the body B, to draw the fingers 6 tightly against the outer face of the member 1 at a location between the flanges 4, and thus frictionally bind the fingers 6 to the upper face of the member 1, and the member 1, in turn, on its under face, to the outer exposed surface of the automobile body B. In some instances, one screw 9 alone is sufficient, but preferably, two are employed as it assists in placing the fastener more accurately in the position desired.

Since the apertures or openings 7 and 8 are elongated, the entire fastener may be adjusted endwise bodily as well as being extended or contracted endwise. Furthermore, the flanges 3 of the fastener can be bent slightly by suitable pliers so that they will be at exactly the right angle to snap securely into the particular trim.

Since there is a wide variation in the width of the trims required, the fingers 6 are scored transversely at regular intervals along their length to facilitate breaking them off to a length desired. The scoring of each finger is aligned with the scoring of the other. Preferably, the scoring is arranged so that the score lines or breaks lines are about an eighth of an inch apart. Thus, if the clip is too long when telescoped with the original fingers, the member 2 or fingers 6 can be clamped in a vise or suitable device and the excess length of the fingers broken off to the point desired, thus shortening the fastener for adapting it to a trim of a particular width.

Ordinarily, the fingers are broken off so that when the fastener is adjusted to the right length for a particular width of trim, the free ends of the fingers extend at least to the outermost end of the flanges 4, and preferably, are seated at their ends against the inner face of the flange 3 at its base. This provides as long a guide surface as is possible and thus renders the fastener more rigid.

In installing the trim, therefore, assuming that a piece has been damaged and removed, the new piece of trim is first held or taped onto the body at the exact position desired. Then a light scoring mark or pencil mark can be made showing the exact location of the trim. Thereupon, the fasteners can be adjusted for various lengths to fit between the score mark with the clearance allowed for the thickness of the trim metal or the width of the flanges on the trim. A number of the fasteners can be thus positioned where desired and adjusted and then holes drilled into the body through the apertures 7 and 8 while the fasteners are held firmly in position. Thereupon, the screws 9 are installed and the bodies 1 and 2 are secured fixedly in position on the automobile body.

After this has been done, then the trim can readily be installed merely by pressing it flange face foremost onto the flanges 3 of the fastener, whereupon it snaps into place in exactly the position at which marked. If, of course, the body surface is to be refinished, then a score mark can be made around the trim and the fasteners installed, and the body then given its final finish before the trim is installed. Any marks or apertures originally in the body for fastening the trim are relatively unimportant as they are covered by the trim.

The present fastener is particularly desirable in those cases in which a large portion of the body may have had to be leaded in order to reestablish its original contour. Quite often, in such instances, the original holes are completely obliterated and cannot be located in any event, except by removing the inner panels or linings of the car, working from the inside, and reboring in the original holes as indicated from the inner surface.

In the present instance, such awkward operations are eliminated.

Furthermore, the trim can be installed on any part of the car desired by using the present fastener without removing any of the inside panels of the car or in any way requiring exposure of faces of the body wall. All of the work can be done from the outside surface on which the piece of trim is to be installed.

In some cases, it is desirable to provide an anti-rattling device to assure a snug fitting and vibration-free engagement of the trim, body, and fastener. For this purpose, an anti-rattling device, indicated generally at 15, is provided. This device comprises a sheet of metal forming a base or body 16 which preferably is of such shape as to lie beneath the fingers 6 and be slid to different positions therealong while frictionally held in place by the fingers. The body 16 has an upturned finger 17. The metal is such that the finger has substantial springiness and must be flexed without permanent distortion to engage the inner face of the trim. The finger is preferably of the proper width to extend through the space 9 between the fingers 6 and is of sufficient height so that it will engage the inner surface of the piece of trim T and be flexed downwardly thereby appreciably when the trim is installed. Thus, after installation, it maintains its resilient pressure against the trim, forcing it outwardly, thus holding the trim flanges snugly against the overhanging portions of the flanges 3 which are exposed toward the body B of the automobile.

The anti-rattling device 15 can be shifted along the clip or fastener to the point desired so that the finger can engage the inside of the trim at the center or at any place where there is an abrupt change in the surface of the trim. After once being installed, since the finger 17 is pressing against the trim at some angularly disposed surface, the finger 17 helps to hold the body 16 in position, and the body, in turn, holds the finger in position.

It is apparent from the foregoing description that the present fastener has distinct advantages over those heretofore provided. It provides a simple and effective means for fastening trim to automobile bodies regardless of the width and contour of the trim. Furthermore, it eliminates not only the necessity for maintaining on hand a large number of various types of fasteners which are often necessary even for a single piece of trim, and which are multiplied by the thousands for all types of trim. Again, it eliminates the necessity of trying to locate the particular clip at some specified place along the trim so that it can fit the particular opening desired in the body. All that is necessary is to position the trim where desired, mark the position, and then apply as many clips at such places as seem desirable to the repairman for fastening the trim in place.

Having thus described my invention, I claim:

1. A fastener for securing to automobile bodies decorative trim of the type having inturned marginal attaching flanges along its rear face, and comprising a pair of relatively telescopically interfitted members extensible and contractible endwise and having a forward face and having a rear face adapted to lie against an automobile body, retaining flanges on the ends of the members, respectively, and extending transversely of the members and facing forwardly from the forward face for snap fastening engagement with the marginal flanges of a length of trim when the length of trim is pressed bodily, flatwise, rear face foremost, toward the forward face, fastening means engageable with at least one of the members and adapted for connection to an automobile body and operable for pressing the members firmly thereagainst for holding the members in place on the automobile body and for constraining the members to preselected position relative to each other, an anti-rattle device, said device having a resilient finger extending forwardly of the forward face of the members for bearing against the rear face of a piece of trim secured by the members and urging the trim outwardly from the forward face of the pair of members when the device is in operating position, and said device having a body portion disposed in underlying relation to the rear face of one of the members in position to be pressed thereby against the automobile body and thus frictionally held in preselected operating positions endwise of the fastener.

2. A fastener for securing to automobile bodies decorative trim of the type having inturned marginal attaching flanges along its rear face, and comprising a pair of relatively telescopically interfitted members extensible and contractible endwise and having a forward face and having a rear face adapted to lie against an automobile body, retaining flanges on the ends of the members, respectively, and extending transversely of the members and facing forwardly from the forward face and adapted for snap fastening engagement with the marginal flanges of a length of trim when the length of trim is pressed bodily, flatwise, rear face foremost, toward the forward face, fastening means engageable with at least one of the members and adapted for connection to an automobile body and operable for pressing the members firmly thereagainst for holding the members in place on the automobile body and for constraining the members to preselected position relative to each other, characterized in that one of said members is in the form of a body with inturned lateral marginal flanges providing guide channels open toward each other and open endwise at the inner end of said body, the other member being in the form of a body with a pair of elongated laterally spaced fingers extending endwise from its inner end and received in said guide channels, respectively, for sliding endwise thereof, the body of said one member having an opening therein in alignment with the space between the fingers and said other member having an opening therein, said fastening means including an attaching element receivable through said opening of said one member and the aligned space between the fingers and adapted to be connected to the automobile body and having a head adapted to engage the fingers and press them into firm juxtaposition with the body of said one member and to press the body of said one member into firm juxtaposition with the automobile body, when the attaching element is connected to the automobile body, and a second attaching element receivable through the opening of said other member and adapted to be connected to the automobile body and having a head adapted to engage and press the body of the other member into firm juxtaposition with the automobile body.

3. A fastener according to claim 2 characterized in that said openings are elongated endwise of the members.

4. A fastener according to claim 2 wherein an anti-rattle device is provided, said device having a body portion adapted to be disposed between said members and the automobile body and having a resilient finger extending between said laterally spaced fingers and adapted to bear against the rear face of a piece of trim secured by the members and to urge the trim outwardly from the forward face of the members when the anti-rattle device is in operating position.

References Cited in the file of this patent

UNITED STATES PATENTS

| | | |
|---|---|---|
| 1,682,060 | Banks | Aug. 28, 1928 |
| 2,411,053 | Ornsteen | Nov. 12, 1946 |
| 2,557,773 | Steinman | June 19, 1951 |